May 28, 1968
F. J. YANKERS
3,385,317
Z-ADAPTER FOR WATER CLOSETS
Filed Oct. 22, 1965
2 Sheets-Sheet 1
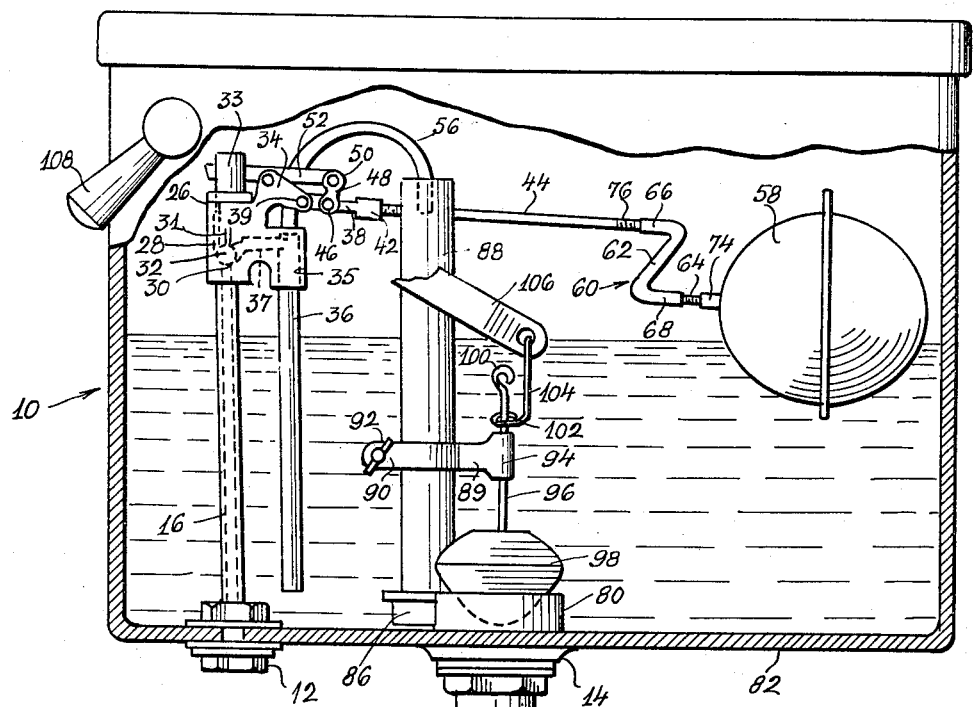
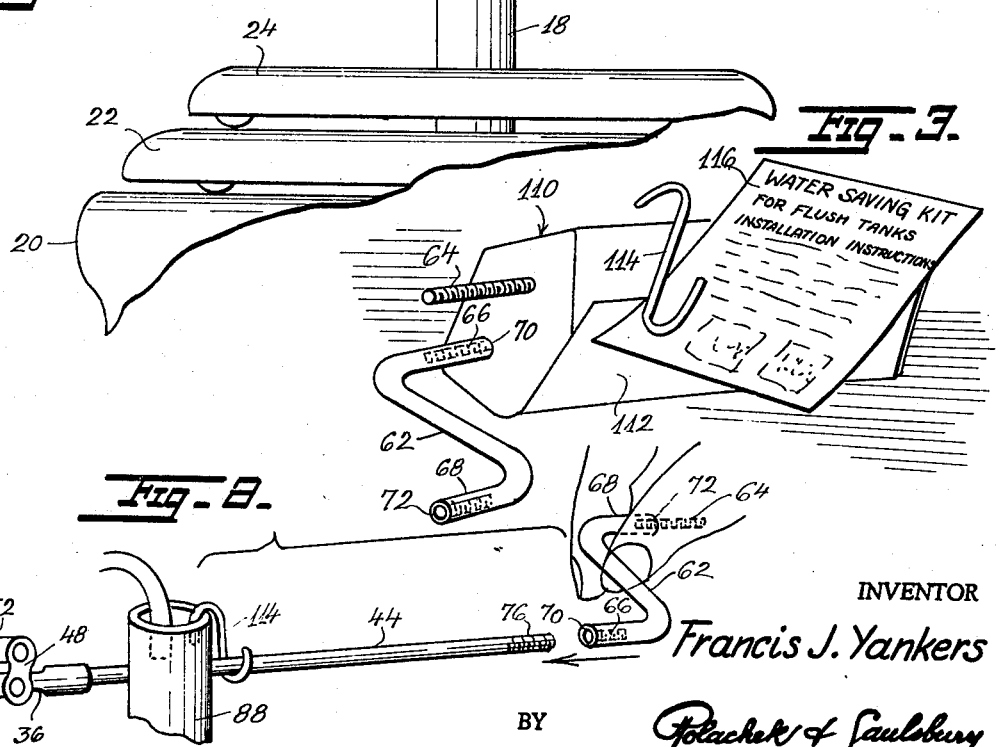
INVENTOR
Francis J. Yankers
BY Polachek & Saulsbury
ATTORNEYS May 28, 1968
F. J. YANKERS
3,385,317
Z-ADAPTER FOR WATER CLOSETS
Filed Oct. 22, 1965
2 Sheets-Sheet 2
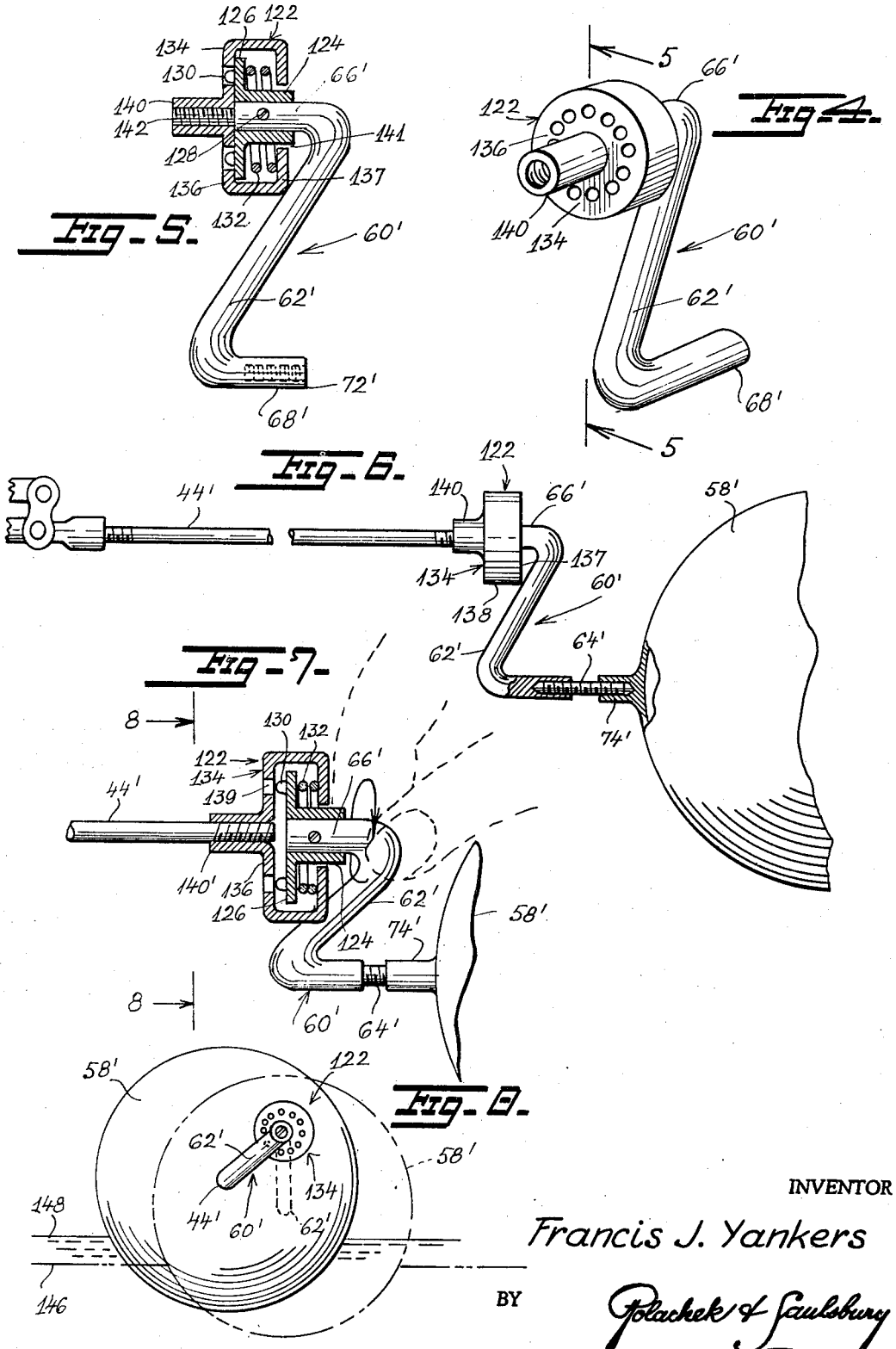
INVENTOR
Francis J. Yankers
BY
Polachek & Saulsbury
ATTORNEYS United States Patent Office 3,385,317
Patented May 28, 1968

3,385,317
Z-ADAPTER FOR WATER CLOSETS
Francis J. Yankers, Newton, N.J., assignor of twenty-five percent to Howard G. Angle, Newton, N.J.
Filed Oct. 22, 1965, Ser. No. 501,602
2 Claims. (Cl. 137—426)

ABSTRACT OF THE DISCLOSURE

A float operated valve for water tanks provided with means for readily adjusting the position of the float in the water tank so as to predetermine the desired depth of water in the tank for flushing the bowl. The tank has a casing with an inlet and an outlet. A vertical tube is connected to the inlet. A valve casing is mounted in the tank having a bore communicating with the tube. A valve system is in the bore and a movable ball shaped valve member on one end of the stem is adapted to close communication between the bore and the tube. A slidable piston is in the bore connected to the other end of the stem and a pivoted lever is operatively connected to the piston. A rod is connected at one end to the lever, and a float adjustably connected to the other end of the rod. The means of adjustable connection includes a Z-shaped adapter and a clutch unit having a clutch member with a sleeve fixed on one end of the Z-shaped adapter, a flange on one end of the sleeve, a second clutch member having a front wall and annular side wall, the front wall having spaced holes therein, ball detents between the front wall and the flange normally seated in the holes in the front wall, a compression spring on the sleeve urging the flange against the balls, and means for moving the flanged clutch member against the action of the spring.

---

This invention relates generally to apparatus for conserving water and more particularly to automatic means for regulating the amount or quantity of water used in flushing a water closet.

At the present time due to the prolonged drought, every conceivable means is being exhausted in order to preserve the diminishing supply of water used in cities. With this in mind I have designed simple and readily installed mechanism for utilizing the present plumbing installations in water closets in homes and the like in saving water.

Accordingly, a principal object of the present invention is to provide means for readily adjusting the position of the float in the water tank so as to predetermine the desired depth of water in the tank for flushing the bowl.

Another object of the invention is to provide an adapter for accommodating present plumbing installations to float control of the depth of water in the tank.

Yet another object of the invention is to provide an adapter for the float rod whereby the float may be positioned at various levels in the tank.

Yet another object of the invention is to provide an adapter for accommodating various sized float rods and a rotary device for holding the adapter and float in adjusted position.

The invention also contemplates a kit containing an adapter for the float rod, a threaded length of rod for making connections and an S-shaped hook for supporting the float rod during installation and adjustment operations.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a part side elevational and part sectional view of a water closet bowl and tank, parts being shown broken away and showing the parts as positioned when the tank has stored therein a predetermined amount of liquid.

FIG. 2 is an elevational view of the float rod and the adapter preparatory to mounting on the float rod.

FIG. 3 is a perspective view of a kit containing an adapter, a length of threaded rod and an S-shaped hook support, a threaded rod and hook being shown outside the kit.

FIG. 4 is a perspective view of an adapter embodying a modified form of the invention.

FIG. 5 is a part side elevational and part sectional view of the adapter of FIG. 4.

FIG. 6 is a side elevational view of the adapter of FIG. 4 connecting a float rod and float, parts being shown broken away.

FIG. 7 is a part sectional and part side elevational view of the adapter of FIG. 5 shown in position for turning the adapter and float to adjusted position.

FIG. 8 is a vertical sectional view taken on the line 8—8 of FIG. 7 showing the float in adjusted position.

Referring now in detail to the various views of the drawings, in FIG. 1 there is shown a conventional water closet tank 10 which may be formed of metal, plastic or vitreous china or the like. The tank is provided with an inlet 12 penetrating its bottom adjacent one side thereof and with an outlet 14 penetrating its bottom centrally thereof. In the intake 12, inside the tank there is positioned a conduit 16 which is adapted to be connected with a source of liquid under pressure (not shown) such as water. A discharge or outlet pipe 18 is connected at its top end to the discharge outlet 14 and is connected at its bottom end to the side of a conventional toilet bowl 20 provided with a conventional seat 22 and a cover 24.

An intake valve is fixed to the top of the intake conduit 16 and includes a valve casing 26 with a vertically disposed bore 28 therein and with a valve seat 30 at the bottom of the bore. A valve stem 31 has a ball valve 32 connected thereto seated against the seat 31 and has its opposite end connected to a sliding piston 33 mounted in the bore 28 of the valve casing.

The valve casing 26 is formed with a triangular shaped arm 34 extending laterally into the tank and with a laterally extending downwardly opening outlet 35 connected to bore 28 by a bypass 37 and closet filling tube 36. As shown this tube 36 extends downwardly with its open end spaced from the bottom of the tank in order to prevent splashing of the liquid and noise when the tank is filling by discharging beneath the surface of the liquid stored in the tank.

A lever 38 has one end pivotally connected by means of a pivot pin 39 to the free corner of the arm 34 the other end of the lever being formed with a socket 42. One end of a float rod 44 is secured in the socket 42. Pivoted at 46 to the lever 38 is a link 48, said link being pivoted at its other end as indicated at 50 to a lever 52. The lever 52 is pivoted midway its ends to the arm 34 and is pivoted at its other end to the piston 33 slidably mounted in the valve casing 26 for controlling the flow of liquid through the valve in the usual manner. A downwardly curved after fill pipe 56 is connected to the top of the outlet 35 for discharging a small quantity of water into the bowl when the tank is practically empty.

In accordance with the invention, interposed between the rod 44 and the ball float 58 there is an adapter assembly 60 constituted by a Z-shaped length of round rod 62 and a short straight length of rod 64. The ends 66 and 68 of the rod 62 are formed with sockets 70 and 72, respectively, the sockets being internally screw threaded. The short rod 64 has one end threaded into a socket 74 formed on the ball float 58. One end of the Z-shaped rod 62, the end 66, for example, is threaded onto the threaded end 76 of the rod 44, and the other end 68 is threaded onto the other end of the short rod 64 as seen in FIG. 1.

The mechanism for flushing the tank 10 will now be described. A valve seat 80 is mounted on the bottom wall 82 of the tank 10 around the outlet 14 and formed integrally with the seat 80 there is a laterally extending pan-like seat 86 for supporting an overflow tube 88. Seat 86 communicates through the valve seat 80 with the outlet 14. A bracket 89 is removably supported on the overflow tube intermediate its ends. The bracket includes a bifurcated end 90 encircling the overflow tube and fastened thereto by a wing nut 92. The other end of the bracket is formed with a vertically disposed integral sleeve portion 94. A valve stem 96 extends loosely through the sleeve and carries a frusto-conical shaped tank ball 98 on its bottom end. The ball is adapted to fit upon the valve seat 80 and prevents the water from escaping downwardly through the discharge outlet 14. The other end of the stem 96 is formed with a loop 100 adapted to interlock with and limit movement of the looped end 102 of a link 104 fastened to one end of a tiltably supported elongated lever 106, the other end of the lever being operatively connected to an actuating handle 108 lockably mounted on the outside of the tank. With this tripping mechanism, it is possible to flush the tank with the greatest of ease and without any likelihood of the parts becoming hung.

In operation, when the water is low in the tank and the ball 58 has descended to its lowermost position, the lever 38 is moved to drawing the link 48 to the right in FIG. 1 to swing lever 52 around its pivot point and thereby slide piston 33 to move the valve from its seat and permit the water to flow through the supply pipe 16 and through the valve casing into the filling pipe 36 and from said pipe into the tank. When the ball float 58 rises, the valve ball 32 in the valve casing 26 is gradually closed upon its seat 30 and assisted by the force of the water. The position of the height of the ball float 58 may readily be adjusted by bodily turning the Z-shaped adapter 62 to change its position relative to the vertical, the more it is turned to a vertical position, the lower the ball will be positioned in the tank and the less water will be consumed.

It is contemplated that the Z-shaped adapter assembly 60 and the short length of rod 64 be marketed in a kit, such as the kit 110 shown in FIG. 3. This kit comprises a cardboard container 112 enclosing the assembly including a Z-shaped rod 62, a short length rod 64, a metal S-shaped wire hook 114 and a sheet of instructions 116 for installing the assembly. The hook 114 is used for supporting the float rod 44 during the adjusting operation as shown in FIG. 3, leaving the hands of the operator free.

In FIGS. 4 to 8, inclusive, a modified form of Z-shaped adapter 60' is shown for use with the short rod 64' in adjusting the depth of the water in the tank and holding the adapter in adjusted position. The adapter 60' is similar in shape to the adapter 60 having a Z-shaped body 62'. One end of the body, the end 68', for instance, is formed with an internally threaded socket 72' similar to the end 68 and socket 72 of adapter 62, for receiving one end of the short rod 64', the other end of the rod 64' being threaded in the socket 74' on the ball float 58'.

In the adapter 60', the end 66' is provided with a clutch unit 122 consisting of a clutch member in the form of a sleeve 124 having a circular flange 126 formed integrally on one end thereof. The sleeve is secured on the end 66' by a pin 128 passing through the sleeve and end 66'. A series of ball detents 130 are suitably formed on and around the face of the flange 126. A compression spring 132 is sleeved around the outside of the sleeve 124.

Another clutch member in the form of an annular housing 134 encircles the sleeve 124, flange 126 and spring 132. The housing includes a front wall 136, a rear wall 137 and an annular wall 138 connecting the front and rear walls. The solid front wall 136 is formed with a series of holes 139 and in annular formation corresponding in number and spacing to the number and spacing of the ball detents 130. The rear wall 138 is formed with a central opening 141 through which the end of the Z-shaped adapter passes. An integral tubular hub portion 140 is formed integrally with the front wall 36, the hub portion being internally screw threaded as indicated at 142.

In assembling, the threaded hub 140 of the clutch device 122 is threaded onto the threaded end of the float rod 44', and the socketed end 68' of the Z-shaped adapter 60' is threaded on the projecting end of the short rod 64', the other end of the rod being threaded in the socket 74' of the float 58'. The float 58' may be adjusted to any desired level in the tank such for example as the levels indicated at 146 and 148 in FIG. 8. This is accomplished by turning the adapter 60' and clutch element including the sleeve 124 and flange 126 bodily as a unit on the short rod 64' so as to move the unit toward the float 58' and thus release the ball detents 130 from the holes 139 in the housing 122 as shown in FIG. 7. When the parts are thus released as shown in FIG. 7, the unit together with the short rod 64' and float 58' may be swung to a position at an angle to the vertical thereby carrying the float upwardly from the position of FIG. 7 in order to preset the water level at an adjusted height as desired, for example, to the level 146 or 148 as shown in FIG. 8.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. In a float operated valve for tanks, a supply pipe connected to an inlet in the bottom of the tank and extending upwardly through the tank, a valve casing fixed on the top of the pipe, said valve casing having a vertical bore, the bottom end of said vertical bore forming a valve seat, said valve casing having an outlet in the bottom thereof and having a bypass connecting the bore and the outlet, a valve stem in the vertical bore, a valve carried on one end of said valve stem and seated against the valve seat for closing said vertical bore, a piston slidably mounted in said vertical bore and connected to the other end of the stem, an arm extending laterally of the valve casing, a lever pivotally secured to said arm, a rod connected to said lever, a float operatively and adjustably connected to said rod, operating members carried by said lever, said operating members including a link and a lever, said latter lever cooperating with the piston whereby upon downward movement of the float rod the piston will move the valve from the valve seat and allow the tank to be filled, said float being formed with a socket portion, the adjustable connection between the rod and float being constituted by a removable adapter assembly including a Z-shaped adapter connected at one end to the end of the rod, and a short threaded rod connected at one end to the other end of the Z-shaped adapter and connected at its other end to the socket portion of the float, the end of the Z-shaped adapter connected to the adjacent end of the rod being solid, the connection between said one end of the Z-shaped adapter and the end of the rod being constituted by a clutch unit including a clutch member having a sleeve fixed on said one end of the Z-shaped adapter, the flange on one end of the sleeve, ball detents carried on the face of the flange and a compression spring around the sleeve, another clutch member constituted by an annular housing having a front wall, a rear wall and an annular wall connecting the front and rear walls, the front wall having a series of holes therein corresponding in number and spacing to the number and spacing of the ball detents, the rear wall having a central opening to receive the ends of the Z-shaped adapter and an internally screw threaded hub portion on the front wall threaded onto the adjacent end of the rod.

2. As an article of manufacture, an adapter comprising a Z-shaped metal body, one end of the body being solid, the other end being socketed with internal screw threads, and a clutch unit carried on the solid end of the body, said unit including a clutch member having a sleeve fixed on the solid end of the body, a flange formed on one end of said sleeve, ball detents carried on the face of said flange, a compression spring around said sleeve, another clutch member constituted by an annular housing with front and rear walls and an annular wall connecting said front and rear walls, the front wall having a series of holes corresponding in number and spacing to the number and spacing of the ball detents, and a hub portion projecting laterally from the front wall, said hub portion having internal screw threads.

References Cited

UNITED STATES PATENTS

| | | | |
|---|---|---|---|
| 1,178,349 | 4/1916 | Rockey | 137—441 |
| 2,236,383 | 3/1941 | Russell | 206—47 X |
| 2,664,261 | 12/1953 | Stephany | 251—234 X |
| 2,886,172 | 5/1959 | Hodges et al. | 206—47 |

WILLIAM F. O'DEA, *Primary Examiner.*

D. R. MATTHEWS, *Assistant Examiner.*